United States Patent [19]
Smith et al.

[11] Patent Number: 5,172,511
[45] Date of Patent: Dec. 22, 1992

[54] FISH OR BAIT PRESERVATION APPARATUS AND METHOD

[76] Inventors: Leonard S. Smith, 6319 Girard Ave. South, Richfield, Minn. 55423; Gary L. Cook, 9808 Blaisdell Ave. South, Bloomington, Minn. 55420

[21] Appl. No.: 643,365

[22] Filed: Jan. 22, 1991

Related U.S. Application Data

[63] Continuation-in-part of Ser. No. 546,116, Aug. 8, 1990, abandoned.

[51] Int. Cl.⁵ .............................. A01K 97/00
[52] U.S. Cl. .......................... 43/56; 261/121.2
[58] Field of Search ................ 43/55, 56, 57; 261/121.2, 151; 119/5

[56] References Cited

U.S. PATENT DOCUMENTS

| | | | |
|---|---|---|---|
| 4,168,590 | 9/1979 | Beshoner, Sr. | 43/55 |
| 4,462,180 | 7/1984 | Scott | 43/57 |
| 4,677,785 | 7/1987 | Lambourn | 43/55 |
| 4,712,327 | 12/1987 | Ross | 43/57 |
| 4,748,765 | 6/1988 | Martin | 43/55 |
| 4,945,672 | 8/1990 | Raia | 43/55 |
| 5,010,681 | 4/1991 | Cox | 43/55 |

*Primary Examiner*—Richard K. Seidel
*Assistant Examiner*—James Miner

[57] ABSTRACT

A fish or fish bait preservation apparatus and method utilizing ice as a coolant and piping bait or fish containing water therethrough to maintain this water at an automatic electronically controlled temperature and returning this water appropriately cooled to a fish or bait tank through a conductor having an aerating nozzle.

2 Claims, 2 Drawing Sheets

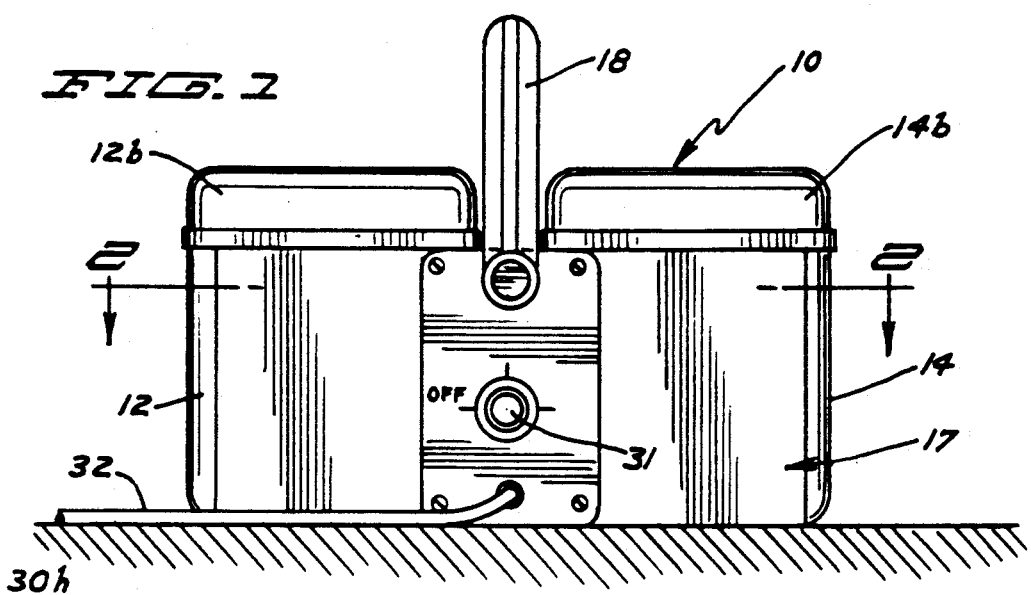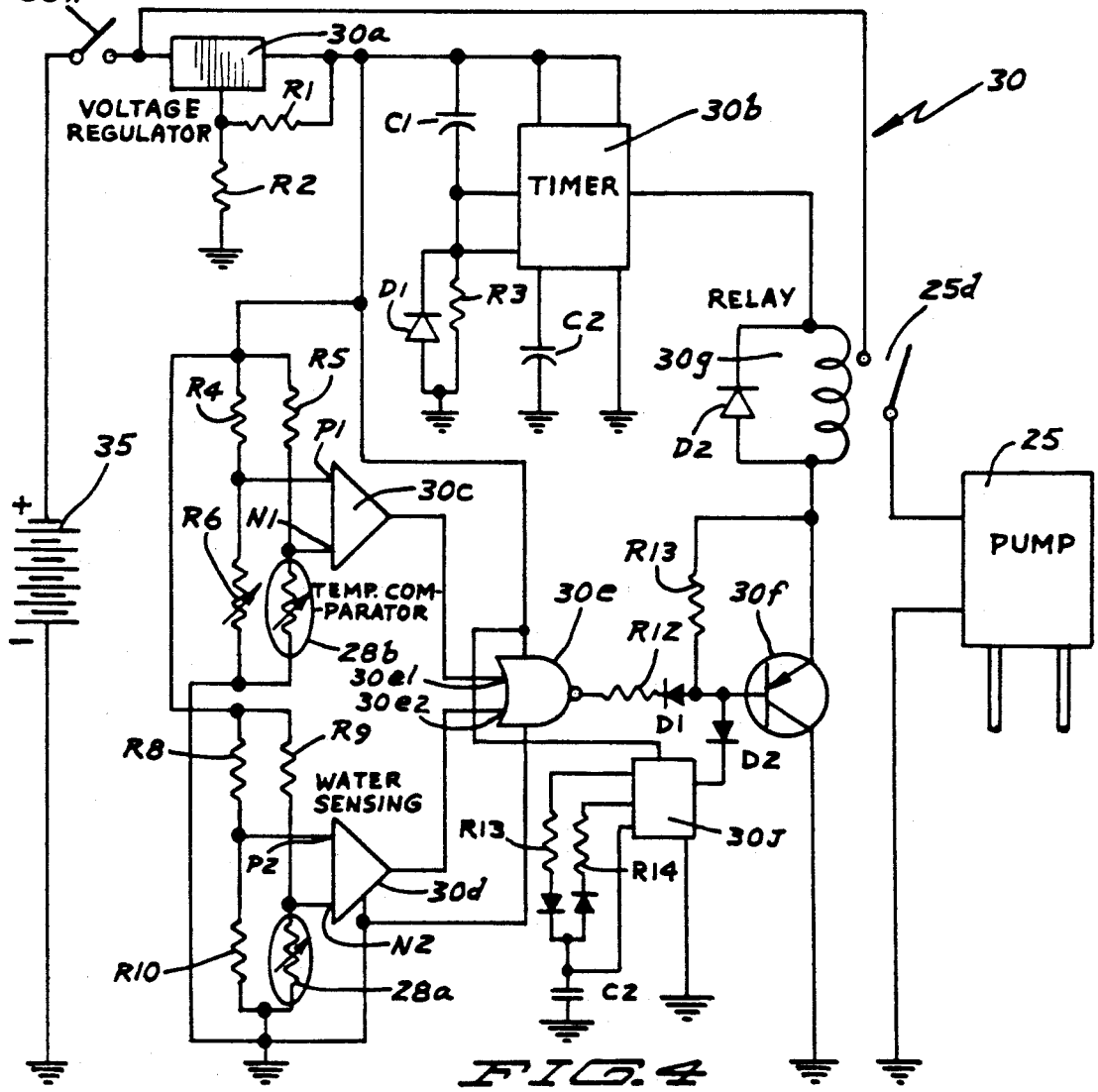

FISH OR BAIT PRESERVATION APPARATUS AND METHOD

This application is a continuation-in-part of application Ser. No. 546,116 filed Aug. 8, 1990, now abandoned.

BACKGROUND OF THE INVENTION

1. Field Of Invention

This invention relates to a cooling and aerating bait or fish containing water which is maintained in its natural state in a suitable container.

2. Brief Description Of The Previous Art

To preserve fishing bait or fish, the same must be contained in a natural water environment in which both the temperature and oxygen content must be controlled within the tolerable levels to which the bait and fish are naturally accustomed.

Once acquired, the bait and fish may be transported in several ways. Frequently used are insulated buckets containing lake or river water and some buckets have aerating means to maintain or increase the oxygen content of the water used.

Ice is commonly used as a cooling agent but commercially made ice generally contains chlorine, flourine and other chemicals which are fatal to bait and fish and further most waters supplied for human use contain chemicals, such as chlorine, which cause the death of aquatic life. More often than not, no effort is made to precisely control temperature as well as the oxygen content of the water containing bait and fish and both of these elements require precise control to preserve bait and fish in an alive condition. As is known, the temperature of water is inversely proportional to the amount of oxygen that the water contains and this is commonly overlooked by a fisherman in carrying his bait and fish about. It is a common practice for fisherman to fill his bait and/or fish bucket from a water source such as a lake at his fishing site and in summer the surface water is relatively hot and oxygen depleted which is a thermal shock to bait and fish which are accustomed to deeper cool water having an adequate oxygen content.

It is extremely difficult for a fisherman to duplicate the natural condition of water that is maintained such as by a bait dealer.

In the present economic situation, bait is expensive but more important, it is essential for satisfactory fishing to maintain the bait in an alive condition for fishing purposes and particularly, for the duration of a fishing trip.

As to the reference material of which there is knowledge, electrical energized refrigeration systems are known to maintain fish tanks and these are not portable and are clearly distinguishable from the situation of the invention disclosed herein.

SUMMARY OF THE INVENTION

This invention relates to a portable and boat mountable apparatus for maintaining live fishing bait or fish in what can be regarded as a natural environmental body of water.

The apparatus herein provides for the use of natural environmental water in a suitably insulated container and maintaining for cooling purposes, an ice supply in an isolated compartment adjacent to said container or remote therefrom, with the natural water being piped through cooling coils in the isolated or remote ice compartment, a pump being used to move the water, the pump action being controlled by an electronic circuit which senses the temperature of the water containing the bait and operates the cooling action by circulating the water to maintain it at a preset temperature with the water being returned to the bait or fish container through an aerating nozzle to maintain a given level of oxygen content in the water. The electric power may be provided by a 12 V battery that most powered boats utilize for other equipment or a dry cell attachment may be provided.

This entire apparatus requires very little electrical power and has a very low operating cost and maintains bait in a live condition ready for fishing purposes and maintains fish in a live condition.

As to operating costs, it requires only 10 milliamps to operate the sensor arrangement and only one amp to operate the pump for circulating the water. Further, in using natural ice as a coolant, one part of ice cools eighty parts of water, making this a very cost saving coolant.

There is substantial activity in Catch and Release Tournaments wherein there is reported a mortality rate of fish caught on the order of 98% due to the release of fish into warm surface temperature waters. This is a problem of a serious magnitude. This problem is avoided entirely by the structure herein wherein fish are released into and maintained in temperature regulated water which is the natural habitat temperature to which fish are accustomed.

Thus the structure herein provides for sustaining both bait in a live condition and the life of caught fish either for subsequent release or for use as a food product.

These and other objects and advantages of the invention will be set forth in the following description made in connection with the accompanying drawings in which like reference characters refer to similar parts throughout the several views.

DESCRIPTION OF THE DRAWINGS

FIG. 1 is a view in front elevation;

FIG. 4 is a wiring diagram.

DESCRIPTION OF A PREFERRED EMBODIMENT

Figure 2:
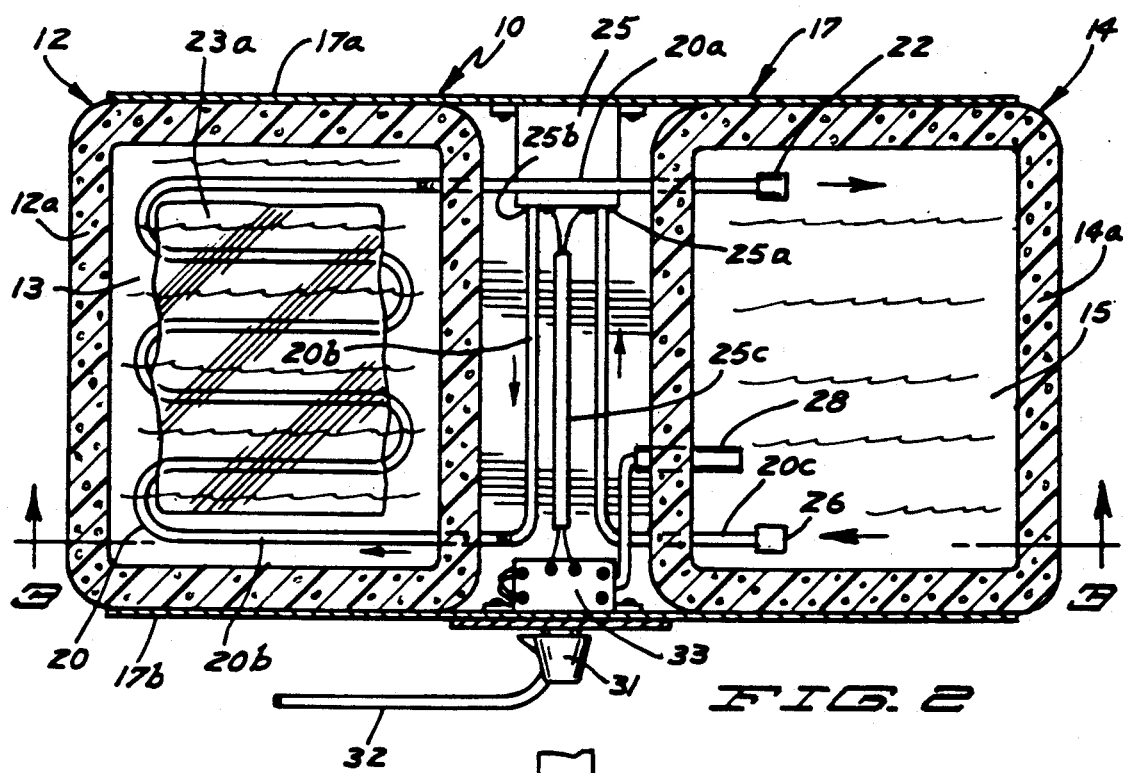
FIG. 2 is a view in horizontal section taken on line 2—2 of FIG. 1 as indicated.

Referring to the drawings and more particularly to FIGS. 1 and 2, the bait or fish holding apparatus herein is indicated generally by the reference numeral 10 and consists of containers 12 and 14 having therein chambers 13 and 15. The containers preferably are of a size to be readily portable in pairs by hand. These are state of the art containers having thermally insulated body portions 12a and 14a and having tight fitting well insulated lids or covers 12b and 14b.

It is to be understood that each container may be free standing and connected with each other by detachable tubes as will be further described or a single container may contain both chambers isolated as by a thermally insulated partition. The container 14, although shown here containing bait such as minnows, may be of a size to accommodate various sized fish.

As shown here in FIG. 1, in the present embodiment for purpose of illustration said containers are shown to be of a size to be conveniently held in adjacent portions by a suitable holder 17. As indicated here, said holder 17 is shown to be substantially U-shaped in cross section having side walls 17a and 17b and a connecting bottom wall 17c. Said holder will snugly engage and retain the containers 12 and 14 as illustrated.

Centrally of said member 17 and suitably pivoted thereto is handle 18 whereby the entire apparatus is readily transportable.

Referring to the chamber 13, a heat exchanger 20 is disposed adjacent the bottom thereof. This will be constructed of any metallic tubing having good thermal conductivity and is in the general form of several U-shaped coils lying on the bottom of the chamber. An outlet end 20a of said tubing is extending upwardly in FIG. 3 and further extending as an inlet into the chamber 15 adjacent the top thereof. The end of the tube is fitted with a conventional aerator 22 to provide adequate oxygen content in the water passing into said chamber 15. In the use of separated chambers, the tubing between the chambers would be adequately insulated.

As illustrated, said chamber 13 has an ice content 23 shown as a cube of ice and a water content 23a of melted ice. The chamber 13 is particularly adapted to use ice as a coolant. Ice is a low cost and an efficient coolant. One portion of use effectively cools eighty portions of water and in a well insulated container, as herein, this cooling extends over a long period of time.

The chamber 15 is supplied with a natural environmental water 24 to maintain in a live state the live bait or fish 27 therein.

An inlet tube 20b in said chamber 13 adjacent the bottom thereof extends outwardly to the outlet 25b of a conventional pump 25, said pump being described as disposed between the chambers secured to the wall 17a. Said tubing 20 of said chamber 15 has an extension 20c as an outlet therefrom adjacent the bottom thereof and running to an inlet 25a of said pump.

It is noted that the end of said tube 20c within the chamber 15 is fitted with a strainer or filter as indicated at 26 to prevent bait from entering the outlet tube.

Also present within the chamber 15 is a sensor 28 which has two parts. One of said parts is 28a which is sensitive to the presence of water and the other part is 28b which is sensitive to the temperature of water. The sensor is connected to an appropriate control circuit 30 which is mounted onto a circuit board 33. The sensor requires approximately 10 milliamps of electrical current to operate.

The control circuit will be connected as by the connector 32 to a suitable current supply source 35 such as a 12 V battery not here shown. A control knob 31 on the circuit board allows the user to adjust the temperature setting of the thermal sensor 28b to turn the pump on or off at preset temperatures.

The pump 25 is connected with the circuit board by a connecting line 25c. The pump requires about one amp of current to operate.

Reference will now be had to the circuitry. The basic elements of the circuitry are a voltage regulator 30a, a timer 30b, a temperature comparator 30c, a water sensing comparator 30d, a two input NOR gate 30e, a relay driver 30f and a relay 30g.

The above elements are interconnected in the circuitry which functions as follows:

From the power source 35 a positive 12 volts is applied to the voltage regulator 30a through the on/off switch 30h. The output of said regulator to energize the circuitry is preferably set at a positive 10 volts by the programming resistors R1 and R2.

Figure 3:
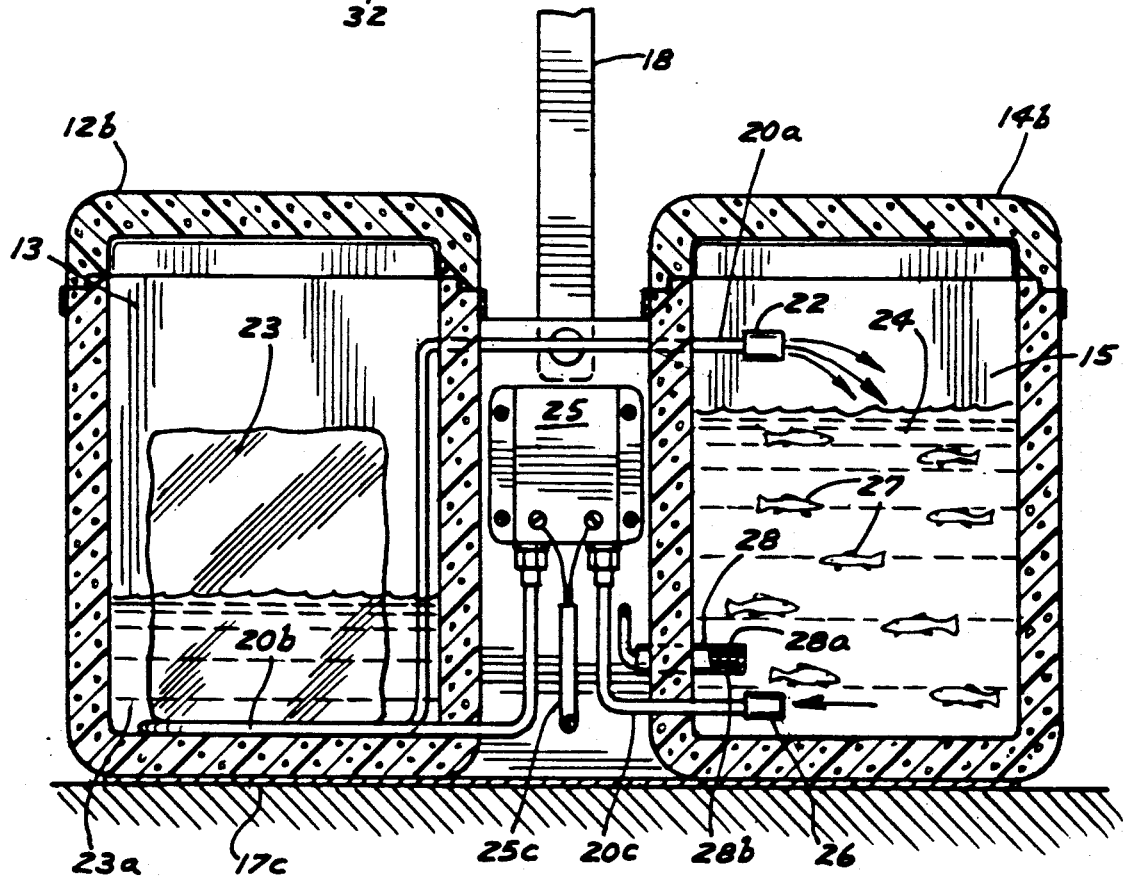
FIG. 3 is a view in vertical section taken on line 3—3 of FIG. 2 as indicated.

The temperature sensing comparator 30c has a reference voltage applied to its positive input P1 which is set by the resistors R4 and R6, the voltage at its negative input N1 is set by the resistor R5 and the thermistor 28b. Said thermistor is mounted as shown in FIGS. 2 and 3 so as to be in contact with bait water. As the water in the container 15 rises in temperature, the resistance of the thermistor decreases causing the voltage on the negative input of the temperature sensing comparator 30d to change. When the voltage on the two inputs of the temperature comparator are equal, the comparator then outputs a logic low which is applied to the one input 30e1 of the two input NOR gate 30e.

The water sensing comparator 30d has a reference voltage applied to its positive input P2 which is set by resistors R8 and R10. The voltage at its negative input N2 is set by resistors R9 and the thermistor 28a which thermistor is mounted so as to be in contact with the water containing bait or fish as shown in FIG. 3.

The resistance value of resistor R9 is chosen to provide sufficient current flow through the thermistor 28a to cause self heating. When the thermistor 28a comes into contact with water, it will cool which changes its resistance and causes a voltage change in the negative input N2 of said water sensing comparator 30d. When the voltage on the two inputs of NOR gate 30d are equal, then 30d outputs a logic low which is applied to the other input 30e2 of the two input NOR gate 30e.

When both inputs of the two input NOR gate 30e are logic lows, it will output a logic low to the base of the relay driver transistor 30f through the base current limiting resistor R12. The relay driver transistor 30f then turns on applying the battery negative to one side of the relay coil 30g. The other side of the relay coil 30g is connected to the voltage regulator through the timer 30b. The contacts of the relay 30g complete the battery circuit to the pump switch 25d when said relay 30g is actuated.

The timer 30b outputs a logic low to the relay 30g during initial power up (each time that the switch 30h is closed) and the logic low is maintained for the time period set by the timer 30b determined by the values of the capacitor C1 and resistor R3. After the time period has passed, the timer 30b outputs a logic high to the relay coil 30g enabling it to respond to the relay driver transistor 30f. The functional reason for this timer is to prevent the pump from operating in the absence of water within the chamber 15 to prevent possible pump damage. The time period is selected to allow the water sensing thermistor 28a to stabilize. This condition only exists in the initial power-up of the apparatus.

With the circuitry and its various related items having been described, the operation will be set forth briefly.

Cooling ice will be placed within the chamber 13. Water natural to the live bait being purchased or fish caught will be placed into the chamber 15. The bait dealer can supply water to contain the bait when the bait is purchased.

When the pump operates, water flows from the chamber 15 through the outlet tube 20c, through the pump 25 and through the intake tube 20b which is an extension of the heat exchanger coil 20 within the chamber 13. This water is pumped through the heat exchanger 20 wherein it is coiled and passed back through the outlet tube 20a into the chamber 15, said tube 20a at its end portion being equipped with an aerator 22.

As described, the pump is controlled by the circuitry 30 which includes a water sensing element to prevent the pump from operating in the absence of water in said chamber 15 and also included as described is a temperature sensing element which turns the pump on or off at preset temperatures. The circuitry and the sensing element controls are shown as being conveniently mounted on the walls 17a and 17b between the two chambers.

The control circuit may have a prefixed temperature setting or the unit may be provided with a control knob such as the knob 31 which varies resistor R6 by means of which the water temperature may be controlled as desired.

The important function of this apparatus is the fact that it preserves the natural condition of bait or fish containing water in which live bait or fish are in a natural habitat. The oxygen content and the temperature of the bait and fish containing water are naturally maintained and preserved. This water is completely isolated from the cooling apparatus in being passed through a conduit forming a heat exchanger in the cooling chamber containing ice as a coolant. The aerator attachment to the inlet tube discharging into the chamber 15 provides an adequate supply of oxygen. The tubes in passing from one chamber to the other will be well insulated.

The entire apparatus is compact and easily carried. If desired the chambers 13 and 15 may be separately positioned and as indicated, the chamber 15 may be of a size to accommodate fish. The controls may be otherwise mounted as in a permanent boat installation. The connecting tubes between the chambers may be flexible and readily attachable.

It will of course be understood that various changes may be made in form, details, arrangement and proportions of the apparatus without departing from the scope of the invention, which generally stated consists of an apparatus capable of carrying out the objects above set forth, in the parts and combination of parts as disclosed and defined in the appended claims.

What is claimed is:

1. A live fishing bait or fish preservation apparatus, having in combination
    a pair of portable containers each having a chamber therein,
    handle means adapted to unite said containers, to unitarily carry the same,
    one of said containers having a first chamber therein containing water that is a natural habitat for bait or fish,
    the other of said containers having a second chamber therein, said second chamber having a tubular conductor therein forming a heat exchanger,
    a coolant in said second chamber comprising ice,
    means for circulating said water in said first chamber through said conductor in said second chamber to be cooled by said coolant and being isolated from said coolant in said second chamber,
    means for presetting upper and lower reference temperatures for said water in said first chamber,
    water temperature sensing means in said first chamber actuating said circulating means to maintain said water in said first chamber between said upper and lower reference temperatures.

2. The method of preserving live fishing bait or fish consisting of the steps of,
    placing live bait or fish in a chamber of a first portable container having natural environmental water in said chamber,
    placing ice and water cooled by said ice in the chamber of a second portable container,
    placing a tubular conductor having an aerating head in said chamber of said second container,
    presetting upper and lower limits of temperature for said water in said first mentioned chamber,
    circulating said water in said first mentioned chamber through said conductor in said second mentioned chamber, and
    providing water temperature sensing means in said first chamber to actuate and circulate said water into said first mentioned chamber between said reference temperatures.

* * * * *